United States Patent
Peng et al.

(10) Patent No.: US 9,964,788 B2
(45) Date of Patent: May 8, 2018

(54) LIQUID CRYSTAL DISPLAY STRUCTURE

(71) Applicant: Century Technology (Shenzhen) Corporation Limited, Shenzhen (CN)

(72) Inventors: Hai-Bo Peng, Shenzhen (CN); Chen-Fu Mai, New Taipei (TW); Ping Liu, Shenzhen (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 116 days.

(21) Appl. No.: 14/995,406

(22) Filed: Jan. 14, 2016

(65) Prior Publication Data

US 2016/0238875 A1 Aug. 18, 2016

(30) Foreign Application Priority Data

Feb. 13, 2015 (CN) .......................... 2015 1 0080260

(51) Int. Cl.
*G02F 1/1333* (2006.01)
*F21V 8/00* (2006.01)
*G02F 1/1335* (2006.01)

(52) U.S. Cl.
CPC ..... *G02F 1/133308* (2013.01); *G02B 6/0031* (2013.01); *G02B 6/0088* (2013.01); *G02F 1/133528* (2013.01); *G02F 2001/133322* (2013.01); *G02F 2001/133388* (2013.01)

(58) Field of Classification Search
CPC ......... G02F 1/133528; G02F 1/133308; G02F 2001/133322; G02F 2001/133388; G02B 6/0088; G02B 6/0031
USPC ...................................... 349/58, 96
See application file for complete search history.

(56) References Cited

U.S. PATENT DOCUMENTS

| | | | | |
|---|---|---|---|---|
| 6,690,032 B1* | 2/2004 | Umetsu | ................. | G02F 1/1345 257/621 |
| 8,297,823 B2* | 10/2012 | Cho | ..................... | G02B 6/0068 349/58 |
| 2002/0080298 A1* | 6/2002 | Fukayama | ........ | G02F 1/133308 349/58 |
| 2009/0068381 A1* | 3/2009 | Yi | .......................... | G02B 1/105 428/1.31 |
| 2011/0128756 A1* | 6/2011 | Cho | ..................... | G02B 6/0068 362/606 |

FOREIGN PATENT DOCUMENTS

CN 103149743 A 6/2013
JP 2002341318 A * 11/2002

\* cited by examiner

*Primary Examiner* — Hoan C Nguyen
(74) *Attorney, Agent, or Firm* — ScienBiziP, P.C.

(57) ABSTRACT

A liquid crystal display structure includes a liquid crystal display panel, a backlight assembly arranged on one side of the liquid crystal display panel, and a polarizer arranged on a side of the liquid crystal display panel opposite from the backlight assembly. The liquid crystal display structure includes a display area and a non-display area surrounding the display area. The polarizer includes a first section and a second section, the first section being located in a central portion of the polarizer and corresponding in position to the display area, and the second section surrounding the first section and corresponding to the non-display area. The second section of the polarizer defines at least one through hole between every two adjacent corners of the second section.

9 Claims, 4 Drawing Sheets

LIQUID CRYSTAL DISPLAY STRUCTURE

CROSS-REFERENCE TO RELAYED APPLICATIONS

This application claims priority to Chinese Patent Application No. 201510080260.9 filed on Feb. 13, 2015, the contents of which are incorporated by reference herein.

FIELD

The subject matter herein generally relates to a liquid crystal display structure and a polarizer of the liquid crystal display structure.

BACKGROUND

A liquid crystal display structure may include a liquid crystal display panel, at least one polarizer, and a backlight assembly.

BRIEF DESCRIPTION OF THE DRAWINGS

Implementations of the present technology will now be described, by way of example only, with reference to the attached figures.

DETAILED DESCRIPTION

Figure 1:
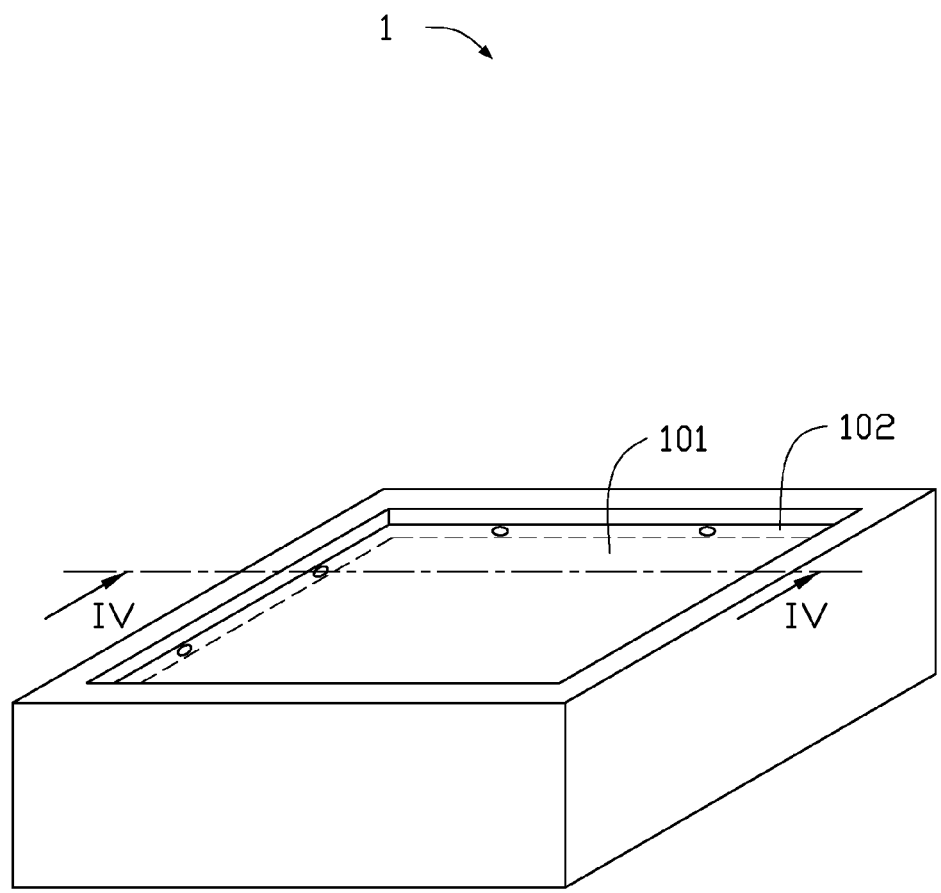
FIG. 1 is an assembled, isometric view of an embodiment of a liquid crystal display structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of a liquid crystal display structure 1. The liquid crystal display structure 1 includes a display area 101 and a non-display area 102. The display area 101 can be substantially rectangular and be located in a substantially central portion of the liquid crystal display structure 1, and the non-display area 102 can be substantially rectangular and surround the display area 101. The non-display area 102 can be non-transparent to block wiring structures of the liquid crystal display structure 1 from view.

Figure 2:
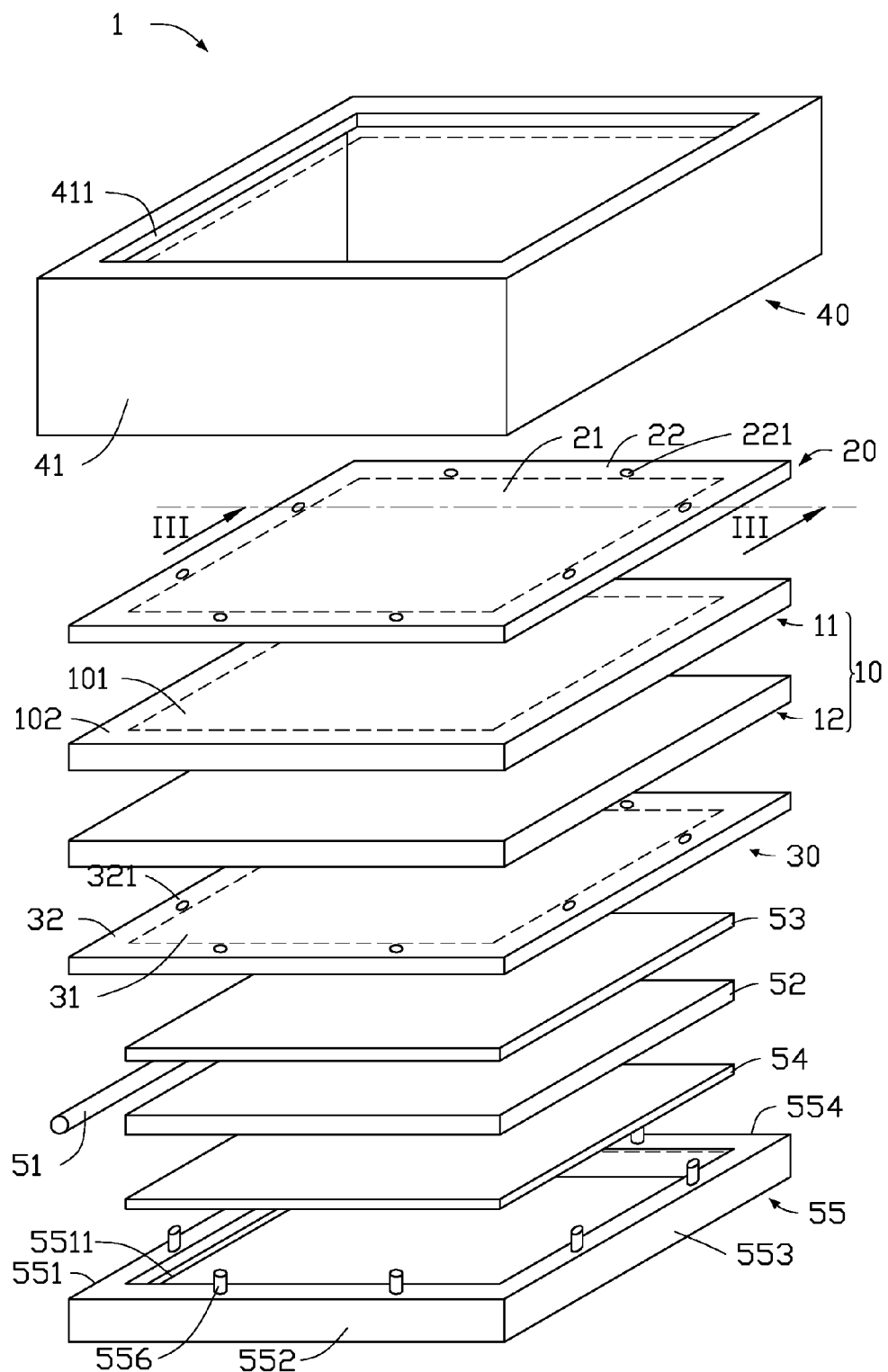
FIG. 2 is an exploded view of FIG. 1.

As illustrated in FIG. 2, the liquid crystal display structure 1 can include a liquid crystal display panel 10, a first polarizer 20, a second polarizer 30, a front frame 40, and a backlight assembly 50. The liquid crystal display panel 10, the first polarizer 20, the second polarizer 30, and the backlight assembly 50 can be received inside the front frame 40. The backlight assembly 50 is used to provide light to the liquid crystal display panel 10 to be viewed through the display area 101.

The liquid crystal display panel 10 can include a first substrate 11, a second substrate 12 opposite to the first substrate 11, and a liquid crystal layer (not shown) located between the first substrate 11 and the second substrate 12. The first polarizer 20 can be arranged on a side of the first substrate 11 facing away from the second substrate 12, and the second polarizer 30 can be arranged on a side of the second substrate 12 facing away from the first substrate 11.

The first polarizer 20 can include a first section 21 and a second section 22. The first section 21 can be substantially rectangular and be located in a substantially central portion of the first polarizer 20. The first section 21 can be aligned with the display area 101. The second section 22 can be substantially rectangular and surround the first section 21. The second section 22 can be aligned with the non-display area 102. The first polarizer 20 can define at least one through hole 221 in the second section 22 between every two adjacent corners of the second section 22. In the illustrated embodiment, two through holes 221 are defined between every two adjacent corners of the second section 22. In at least one embodiment, a shortest distance between the through holes 221 and the first section 21 is less than a shortest distance between the through holes 221 and an outer edge of the second section 22. In at least one embodiment, a shape of the through holes 221 is round, but in other embodiments the shape of the through holes 221 can be any shape. In another embodiment, the number of the through holes 221 defined between every two adjacent corners of the second section 22 can be one, three, or a different number, and the number of the through holes 221 defined between different adjacent two corners of the second section 22 can be different. In at least one embodiment, the diameter of the through holes 221 is 2 millimeters, but in other embodiments the diameter can be different.

Figure 3:
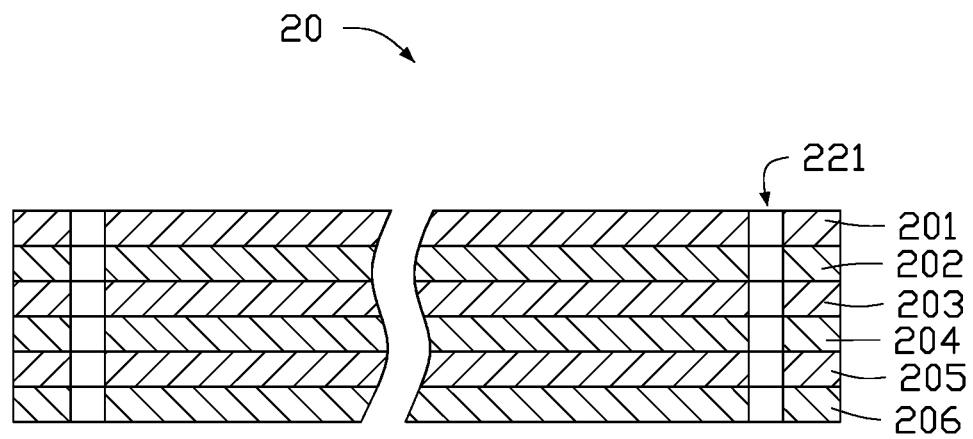
FIG. 3 is a cross-sectional view taken along line III-III of FIG. 2.

As illustrated in FIG. 3, the first polarizer 20 can include a surface protecting film 201, a first protecting layer 202, a polarizing substrate 203, a second protecting layer 204, an adhesive layer 205, and a releasing film 206. The first protecting layer 202 and the second protecting layer 204 can be arranged on opposite sides of the polarizing substrate 203. The surface protecting film 201 can be arranged on a side of the first protecting layer 202 facing away from the polarizing substrate 203. The releasing film 206 can be arranged on a side of the second protecting 204 facing away from the polarizing substrate 203. The adhesive layer 205 can be arranged between the second protecting layer 204 and the releasing film 206.

In at least one embodiment, the polarizing substrate 203 can be a high-molecular polymer made of a polyvinyl alcohol film colored by an organic dye having dichroism.

In at least one embodiment, the first protecting layer 202 and the second protecting layer 204 can be made of triacetate.

The surface protecting film 201 can protect the first polarizer 20 from abrasive or chemical damage and increase a hardness of the first polarizer 20.

In at least one embodiment, the adhesive layer 205 can be a pressure-sensitive adhesive.

In at least one embodiment, the releasing film 206 can be made of polyethylene terephthalate. The releasing film 206 can protect the adhesive layer 205 and maintain cleanliness and adhesive properties of the adhesive layer 205.

The second polarizer 30 can be substantially similar in structure to the polarizer 20. The second polarizer 30 can include a first portion 31 and a second portion 32. The first portion 31 can be substantially rectangular and be located in a substantially central portion of the second polarizer 30. The first portion 31 can be aligned with the display area 101. The second portion 32 can be substantially rectangular and surround the first portion 31. The second portion 32 can be aligned with the non-display area 102. The second polarizer 30 can define at least one second through hole 321 in the second portion 32 between every two adjacent corners of the second portion 32. In the illustrated embodiment, two second through holes 321 are defined between every two adjacent corners of the second portion 32. In at least one embodiment, a shortest distance between the second through holes 321 and the first portion 31 is less than a shortest distance between the second through holes 321 and an outer edge of the second portion 32. In another embodiment, the second polarizer 30 does not define the second through holes 321.

The backlight assembly 50 can include a back frame 55, a light source 51, a light guide plate 52, an optical film set 53, and a reflector 54. The back frame 55 can include a first piece 551, a second piece 552, a third piece 553, and a fourth piece 554 connected end-to-end. Each of the first piece 551, the second piece 552, the third piece 553, and the fourth piece 554 can include an inserting piece 556 protruding from a surface of the corresponding first piece 551, second piece 552, third piece 553, and fourth piece 554 facing toward the liquid crystal display panel 10. The inserting pieces 556 can be inserted into the corresponding second through holes 321 defined in the second polarizer 30. The number and positions of the inserting pieces 556 correspond to the number and positions of the through holes 32.

Figure 4:
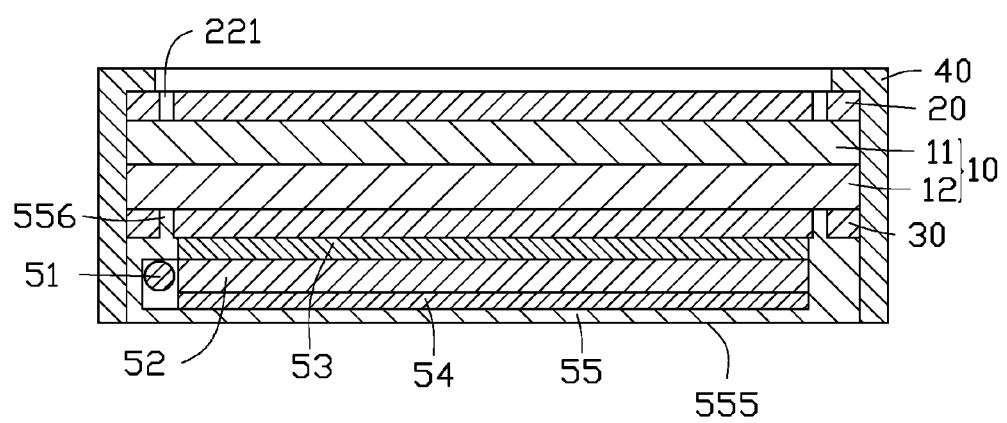
FIG. 4 is a cross-sectional view taken along line IV-IV of FIG. 1.

As illustrated in FIG. 4, the light guide plate 52, the optical film set 53, and the reflector 54 can be arranged in sequence. The optical film set 53 can be arranged on a side of the second polarizer 30 facing away from the second substrate 12. The light guide plate 52 can be arranged on a side of the optical film set 53 facing away from the second polarizer 30. The reflector 54 can be arranged on a side of the light guide plate 52 facing away from the optical film set 53. The light source 51 can be arranged on a side of the light guide plate 52.

The back frame 55 can include a base plate 555. The first piece 551, the second piece 552, the third piece 553, and the fourth piece 554 of the back frame 55 can be arranged on the base plate 555. The base plate 555, the first piece 551, the second piece 552, the third piece 553, and the fourth piece 554 can cooperatively define a receiving space for receiving the light guide plate 52 and the optical film set 53 therein. A side of the first piece 551 facing toward the light guide plate 52 can define a groove 5511 for receiving the light source 51 therein. In the illustrated embodiment, the light source 51 emits light into a side of the light guide plate 52.

In another embodiment, the light source 51 can emit light from a bottom of the light guide plate 52 or from another position relative to the light guide plate 52. In at least one embodiment, the light source 51 is a light emitting diode. In other embodiments, the light source 51 can be another kind of light.

Referring again to FIG. 2, the front frame 40 can include four side panels 41 connected end-to-end. The four side panels 41 can cooperatively define a receiving space. The liquid crystal display panel 10, the polarizer 20, the second polarizer 30, and the backlight assembly 50 can be received inside the receiving space of the front frame 40. Each of the four side panels 41 can include a flange 411 extending toward the receiving space. The flange 411 can cover a portion of the second section 22 of the polarizer 20 without covering the through holes 221.

In at least one embodiment, the adhesive layer of the polarizer 20 and the second polarizer 30 can include a plurality of diffusion particles to allow diffusion of light. Thus, a diffusion layer is not required.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A liquid crystal display structure comprising:
   a liquid crystal display panel having a first side and a second side opposite the first side and comprising a display area and a non-display area surrounding the display area;
   a backlight assembly arranged on the first side of the liquid crystal display panel; and
   a first polarizer arranged on the second side of the liquid crystal display panel and comprising a first section and a second section, the first section being located in a central portion and corresponding in position to the display area, and the second section surrounding the first section and corresponding to the non-display area;
   wherein the second section of the first polarizer defines at least one through hole between every two adjacent corners of the second section;
   wherein the liquid crystal display structure further comprises a front frame; the front frame defines a receiving space to receive the liquid crystal display panel, the first polarizer, and the backlight assembly; each of the at least one through hole is not covered by the front frame and is exposed from the front frame.

2. The liquid crystal display structure as in claim 1, wherein a shortest distance between the through holes and the first section of the first polarizer is less than a shortest distance between the through holes and an outer edge of the second section of the first polarizer.

3. The liquid crystal display structure as in claim 1, wherein
   the front frame comprises four side panels connected end-to-end;
   the four side panels cooperatively define the receiving space;
   each of the four side panels comprises a flange extending toward the receiving space; and the flange covers a portion of the second section of the first polarizer and does not cover the at least one through hole.

4. The liquid crystal display structure as in claim 1, wherein:
the first polarizer comprises a surface protecting film, a first protecting layer, a polarizing substrate, a second protecting layer, an adhesive layer, and a releasing film;
the first protecting layer and the second protecting layer are arranged on opposite sides of the polarizing substrate;
the surface protecting film is arranged on a side of the first protecting layer facing away from the polarizing substrate;
the releasing film is arranged on a side of the second protecting layer facing away from the polarizing substrate; and
the adhesive layer is arranged between the second protecting layer and the releasing film.

5. The liquid crystal display structure as in claim 1 comprising a second polarizer arranged between the liquid crystal display panel and the backlight assembly, wherein:
the second polarizer comprises a first portion and a second portion, the first portion being located in a central portion of the second polarizer, and the second portion surrounding the first portion;
the first portion of the second polarizer is aligned with the display section of the liquid crystal display panel;
the second portion of the second polarizer is aligned with the peripheral section of the liquid crystal display panel surrounding the display section; and
the second portion of the second polarizer defines at least one second through hole between every two adjacent corners of the second portion.

6. The liquid crystal display structure as in claim 5, wherein:
the liquid crystal display panel comprises a first substrate and a second substrate opposite to the first substrate;
the first polarizer is arranged on a side of the first substrate facing away from the second substrate; and
the second polarizer is arranged on a side of the second substrate facing away from the first substrate.

7. The liquid crystal display structure as in claim 5, wherein:
the backlight assembly comprises a back frame;
the back frame comprises a first piece, a second piece, a third piece, and a fourth piece;
the first piece, the second piece, the third piece, and the fourth piece are connected end-to-end;
each of the first piece, the second piece, the third piece, and the fourth piece comprises an inserting piece protruding from a surface of the corresponding first piece, second piece, third piece, and fourth piece facing toward the liquid crystal display panel; and
the inserting pieces are inserted into the corresponding second through holes defined in the second polarizer.

8. The liquid crystal display structure as in claim 7, wherein:
the number and positions of the inserting pieces correspond to the number and positions of the second through holes defined in the second polarizer.

9. The liquid crystal display structure as in claim 7, wherein:
the backlight assembly comprises a light source, a light guide plate, an optical film set, and a reflector;
the optical film set, the light guide plate, and the reflector are arranged in sequence;
the optical film set is arranged on a side of the second polarizer facing away from the second substrate;
the light guide plate is arranged on a side of the optical film set facing away from the second polarizer;
the reflector is arranged on a side of the light guide plate facing away from the optical film set;
the light source is arranged on a side of the light guide plate;
the back frame comprises a base plate;
the first piece, the second piece, the third piece, and the fourth piece of the back frame are arranged on the base plate;
the base plate, the first piece, the second piece, the third piece, and the fourth piece cooperatively define a receiving space for receiving the light guide plate and the optical film set therein; and
a side of the first piece facing toward the light guide plate defines a groove for receiving the light source therein.

* * * * *